United States Patent [19]
Gassmann

[11] Patent Number: 6,016,896
[45] Date of Patent: Jan. 25, 2000

[54] DEVICE FOR CONTROLLING A COUPLING

[75] Inventor: Theodor Gassmann, Siegburg, Germany

[73] Assignee: GKN Viscodrine GmbH, Germany

[21] Appl. No.: 08/788,925

[22] Filed: Jan. 24, 1997

[30] Foreign Application Priority Data

Jan. 26, 1996 [DE] Germany .......................... 196 02 752

[51] Int. Cl.⁷ ................................................. F16D 43/284
[52] U.S. Cl. .................... 192/57; 192/85 AA; 192/103 F
[58] Field of Search .......................... 192/35, 52.4, 54.3, 192/57, 85 AA, 103 F

[56] References Cited

U.S. PATENT DOCUMENTS

| | | | |
|---|---|---|---|
| 4,905,808 | 3/1990 | Tomita et al. | 192/85 AA |
| 5,007,885 | 4/1991 | Yamamoto et al. | 475/231 |
| 5,526,912 | 6/1996 | Gassmann | 192/57 |
| 5,556,343 | 9/1996 | Gassmann et al. | 192/85 AA X |
| 5,690,201 | 11/1997 | Gassmann | 192/35 |

FOREIGN PATENT DOCUMENTS

| | | |
|---|---|---|
| 0283821 | 9/1988 | European Pat. Off. . |
| 4343307A1 | 12/1993 | Germany . |
| 2281109 | 2/1995 | United Kingdom . |
| 2284869 | 6/1995 | United Kingdom . |

*Primary Examiner*—Richard M. Lorence
*Attorney, Agent, or Firm*—Howard & Howard

[57] ABSTRACT

A device for transmitting torque between two parts rotatably mounted relative to one another. The device comprises a friction coupling 12 having friction elements rotationally fixed to each of the parts. The friction elements are rotatably relative to one another. The friction coupling 12 is loadable by at least two movable pistons $19_1$, $19_2$, which delimit a pressure chamber 21 on one side. The pressure chamber 21 is filled with a viscous fluid, and is connected to a reservoir 26. The pressure chamber 21 is formed by a rotational housing 20 and the pistons $19_1$, $19_2$. The rotational housing 20 is connected with one of the rotatable parts. A rotational member 22 rotates inside the chamber 21 and is connected to the other rotatable part. A control member 23 is positioned in a pressure chamber 21 and faces of the rotational member and counter faces of the control member and constitute at least one shear channel 38 which communicates with the reservoir 26 and the pressure chamber 21. The pressure chamber 21 is delimited by said at least two separate, axially movable annular pistons, $19_1$, $19_2$. Based on different characteristic functions, the pistons $19_1$, $19_2$ convert pressure in the pressure chamber 21 to an axial force acting on the friction coupling 12 .

6 Claims, 10 Drawing Sheets

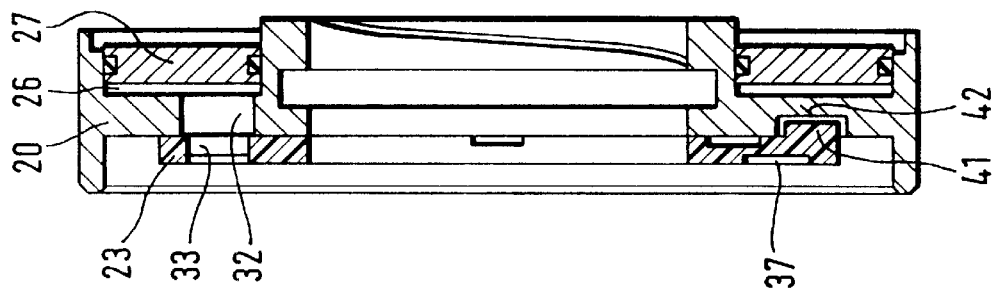
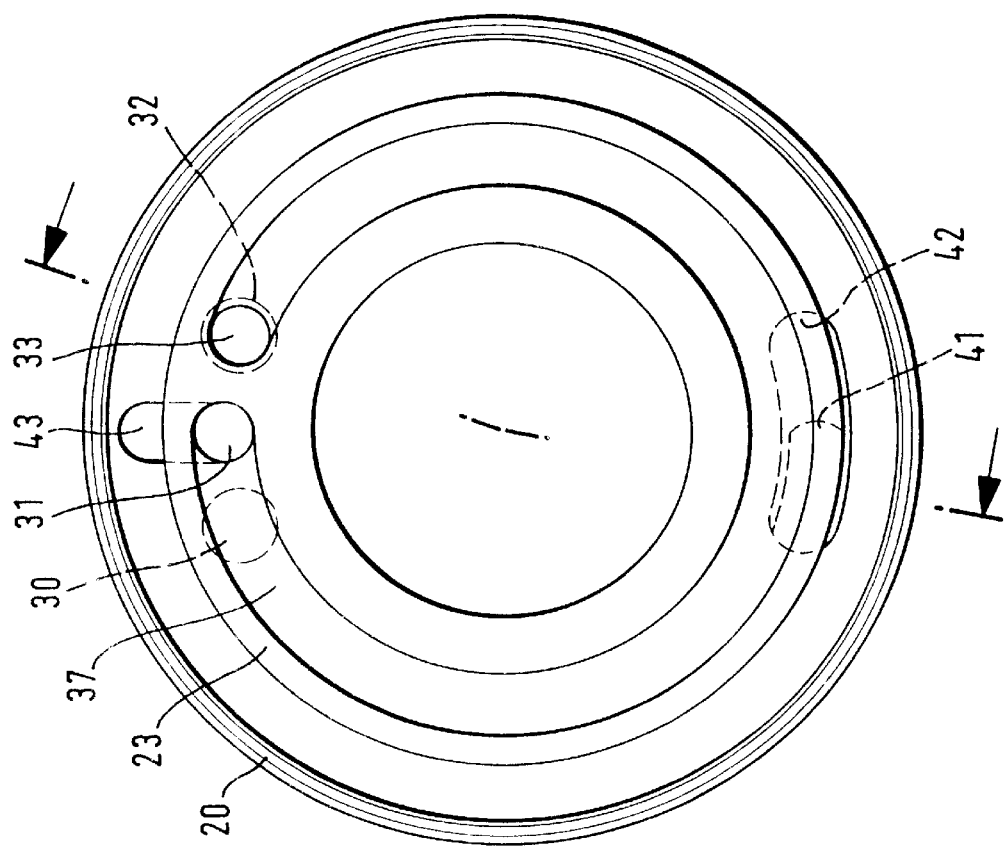

DEVICE FOR CONTROLLING A COUPLING

BACKGROUND OF THE INVENTION

The invention relates to a device for transmitting torque between two parts rotatably mounted relative to one another. The device comprises a friction coupling with friction elements rotationally fixed to each of the rotatable parts. The friction coupling is loadable by at least one movable piston which, on one side, delimits a pressure chamber filled with a viscous fluid. The pressure chamber is connected to a reservoir. The pressure chamber is formed by a rotational housing and the piston. The rotational housing is connected to one of the rotational parts. A rotational member rotates in the pressure chamber and is connected to the other rotatable part. Rotational faces of the rotational member, and counter faces of a control member which is positioned in the pressure chamber constitute at least one shear channel. The shear channel is formed by a shear groove which is laterally delimited by walls, and by a surface covering the shear groove and being rotatable relative thereto. The shear groove extends between two ends in the circumferential direction. The control member is rotatable to a limited extent between two end positions relative to the rotational housing. The shear groove is connected to the reservoir and to the pressure chamber by control apertures in the control member, positioned at the end of said shear groove. The connection is effected such that, in the two end positions of the control member, a control aperture positioned at the front end of the shear groove (when viewed in the direction of relative rotation), communicates with the reservoir and a control aperture positioned at the rear end of the shear groove (when viewed in the direction of relative rotation) communicates with the pressure chamber.

Devices of the type herein described are used in the drivelines of motor vehicles and land machinery for generating a locking moment between two parts rotating relative to one another. The locking moment is dependent on the speed differential.

One application concerns differential drives wherein the coupling is arranged between parts which rotate relative to one another when differential processes occur in the drive. The coupling provides differential drives with a partial locking effect. The differential drives are preferably axle differentials, or central differentials, in motor vehicles.

Another application concerns motor vehicles with at least two driveline branches for a plurality of driven axles. The coupling is arranged directly in the driveline branch associated with one of the axles. As a result, this driveline branch is subjected to torque of a differential speed of the axle of said driveline branch and another directly driven axle by means of the coupling, whereas at identical speeds of the axles the coupling causes the respective driveline branch to be torque-free. The axle of said driveline branch is then dragged along by the vehicle.

Couplings of the above-mentioned type which are capable of sensing speed differentials are clearly advantageous as compared to torque sensing systems, with respect to both traction and driving dynamics.

A device of this type is described in DE 43 43 307 A1. The coupling operates by a pressure drag flow principle based on the shear effect of a viscous medium between two plates moving relative to one another. With relative movement, part of the medium—with reference to one of the plates—is conveyed in the direction of movement of the other plate. A gap between the two plates extends substantially parallel to the direction of relative movement and constitutes a shear groove when the gap is closed on its sides and delimited at two ends and covered by a moveable surface in the direction of the groove, said gap is forming a shear channel. As a function of the magnitude and direction of the relative movement, the shear channel conveys fluid from one end of the shear channel to the other end. The conveying pressure is directly proportional to the length of the shear channel, the viscosity of the sheared medium and the shear rate, i.e. the relative speed. If the shear channel is arranged to connect two chambers, and the two parts which form the shear channel are connected to each of the rotating parts of a coupling, a conveying pressure is generated which is dependent on the differential speed. The conveying pressure can increase the pressure in the pressure chamber. The pressure acts on at least one piston which loads the friction elements of a friction coupling. In this case, the at least one shear channel is recontrolled to generate pressure in both directions of relative rotation independent of the direction of rotation of the parts relative to one another. It is possible, at the time of recontrolling, to connect the shear channel end previously used for providing pressure directly to the reservoir, so that the pressure release at that end does not take place along the entire length of the shear channel. Further, different characteristics of the assembly dependent on the direction of rotation can be achieved in that in one of the two directions of relative rotation of the parts only part of the length of the shear channel for building up pressure is used. This is accomplished by providing an additional connection from the reservoir to the shear channel from an aperture positioned between the shear channel ends. The aperture is open in only one direction of relative rotation and is closed in the other direction of relative rotation.

Furthermore, to achieve different characteristics of the assembly dependent on the direction of rotating, a direct connection can be provided between an aperture and the pressure chamber to shorten the effective channel length for pressure build-up in which the aperture is closed in the opposed direction of relative rotation and positioned between the shear channel ends.

Finally, it has already been proposed to correct the effective forces. The correction depends on the desired curve of the locking moment generated by the friction coupling as a function of the speed differential. For this purpose, spring means may be supported on the housing to load the friction elements on the side facing the piston. Spring means may also be supported on the housing to load the piston on the side facing the friction elements.

The latter embodiments substantially achieve only linear characteristics with respect to the piston force as a function of the speed differential. For certain applications such as using the coupling as an axle differential in a front wheel drive vehicle or as a transfer coupling in a four wheel drive vehicle other characteristics may be desired which are not achievable.

It is therefore the object of the subject invention to provide a coupling having different characteristics of the assembly for use in a variety of applications.

SUMMARY OF THE INVENTION

The objective is achieved by at least two separate, axially movable annular pistons delimiting the pressure chamber. The annular pistons, on the basis of different characteristic curves, convert the pressure in the pressure chamber into an axial force acting on the friction coupling.

It is possible, within the given radial space, to vary different characteristic curve portions by selecting the piston size. For this purpose, each of the annular pistons must be loaded by pretensioning forces optionally acting against, or in the same direction as, the force generated by the pressure in the pressure chamber. The resulting scope for varying the characteristic curves is considerable bearing in mind the minimum additional design measures.

Two preferred embodiments are defined below in greater detail and will be explained with reference to the drawings.

A first preferred embodiment is characterized in that two annular pistons are movable mechanically independent of one another. The two pistons act on a pressure plate which loads the friction coupling. Only one of the annular pistons is pretensioned with a counter force acting against the force applied by the pressure in the pressure chamber. In this embodiment, the inner annular piston may be free of the pretensioning force.

In another preferred embodiment, the first annular piston is axially moveable by the pressure in the pressure chamber mechanically independent of the second annular piston. The second annular piston is axially supported on the first annular piston when force is applied by the pressure in the pressure chamber and acts on the second annular piston, the second annular piston being supported especially by means of an annular collar. The independently movable annular piston can be pretensioned with a weak counter force acting against the force applied by the pressure in the pressure chamber. The annular piston supported on the first annular piston may be pretensioned by a strong counter force acting against the force applied by the pressure chamber.

The pretensioning forces are preferably generated by disc springs supported on the rotational housing. The two above-mentioned embodiments comprise the main possibilities of combining the annular pistons and springs to achieve the required pretension which makes it possible to achieve progressive characteristic curves with one or two bends.

BRIEF DESCRIPTION OF THE DRAWINGS

To make it easier to understand the basic operating principle, reference will first be made to embodiments according to the state of the art. Illustrations and descriptions of embodiments of the solution according to the invention will follow.

FIG. 2a is a longitudinal section of a first embodiment of a coupling of the species referred to;

FIG. 2b is a longitudinal section of a modified embodiment of a coupling of the species referred to;

FIGS. 3a & 3b are a control member as a detail in a first position, in view (a) and in a longitudinal section in view (b);

DETAILED DESCRIPTION OF THE PREFERRED EMBODIMENT

Figure 1:
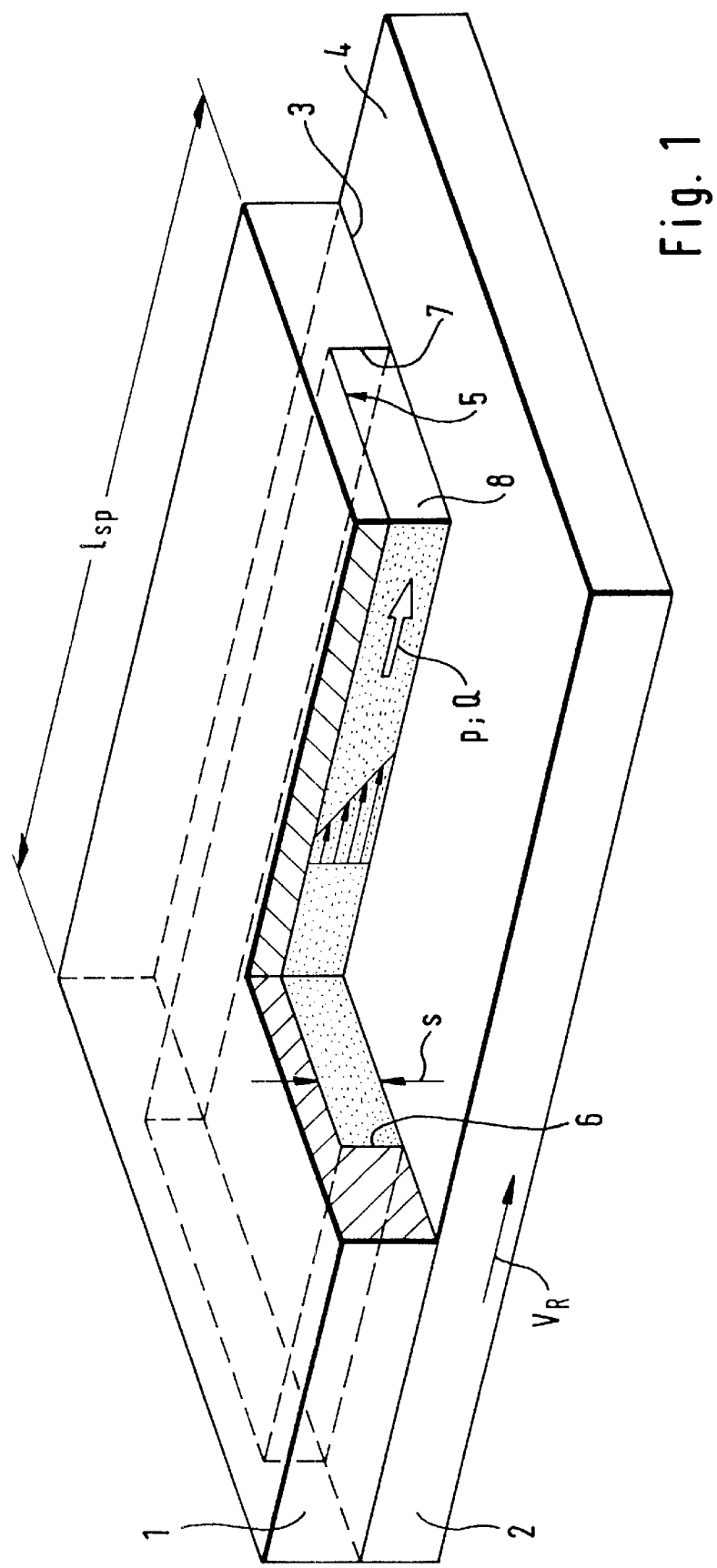
FIG. 1 is an exposed section of two plates movably relative to one another and a shear groove formed in one of the plates constituting a shear channel.

FIG. 1 shows an exposed section of a first plate or disc 1 and a second plate or disc 2 whose end faces 3, 4 contact one another. The first plate 1 is fixed. The second plate 2 moves relative to the plate 1 at a speed $V_R$. The end face 3 of the first plate 1 includes a groove 5 which comprises a rectangular cross-section and laterally delimiting walls 6, 7. The groove 5 and end face 3 form a shear channel 8 which accommodates a viscous medium. The shear channel 8 comprises the length $l_{sp}$ and the height or depth s. When the plate 2 moves, the medium in the shear groove 5 behaves according to the given linear speed profile referred to the fixed plate 1. The surfaces are of course subject to adhesion conditions, both with respect to plate 1 and plate 2, i.e. with reference to plate 2, the speed profile would be reciprocal. With reference to plate 1, in the shear gap there results due to the shear effect, a pressure $p_1$, and a quantity flow Q.

Figure 2A:
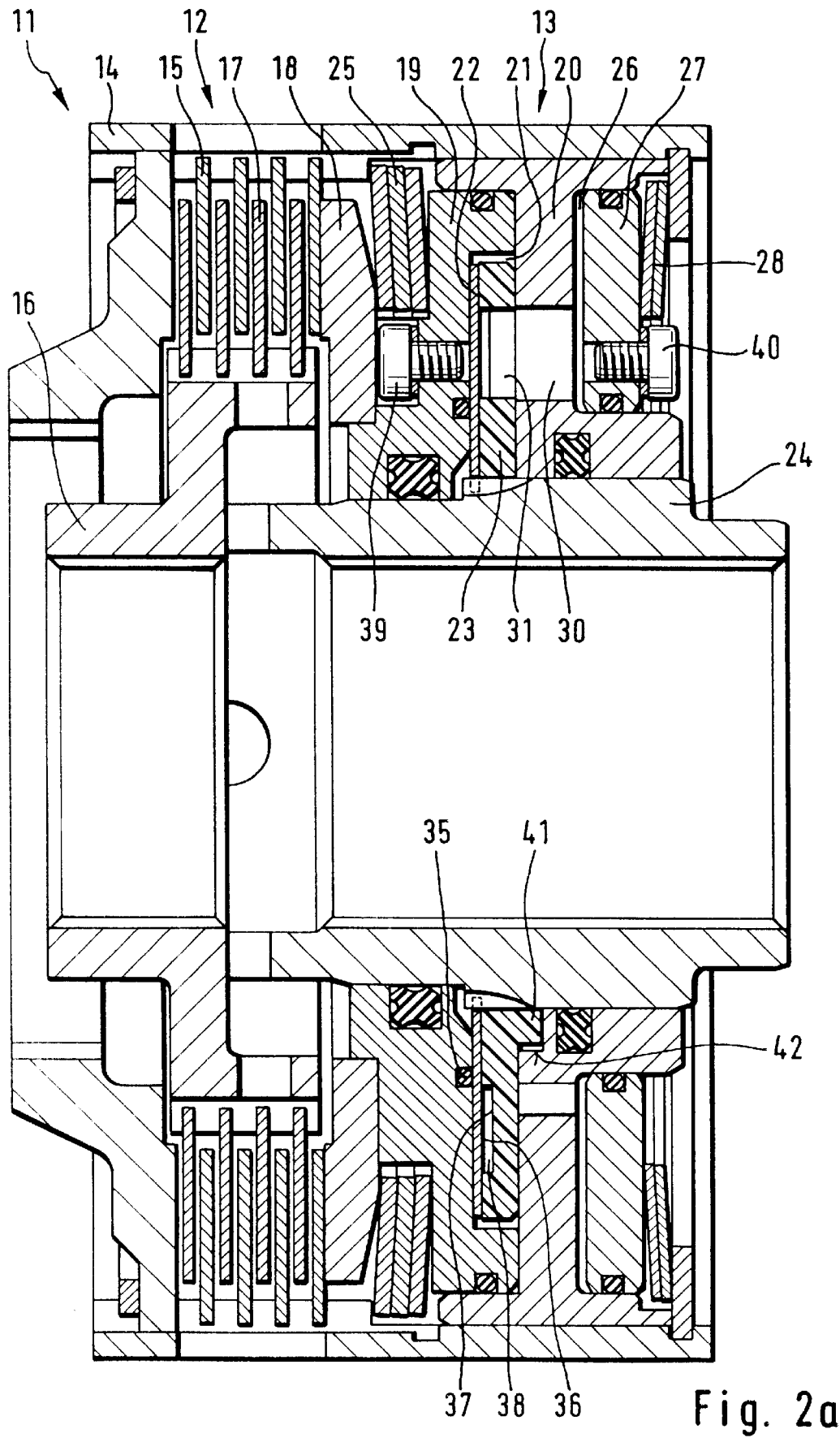
Figure 2B:
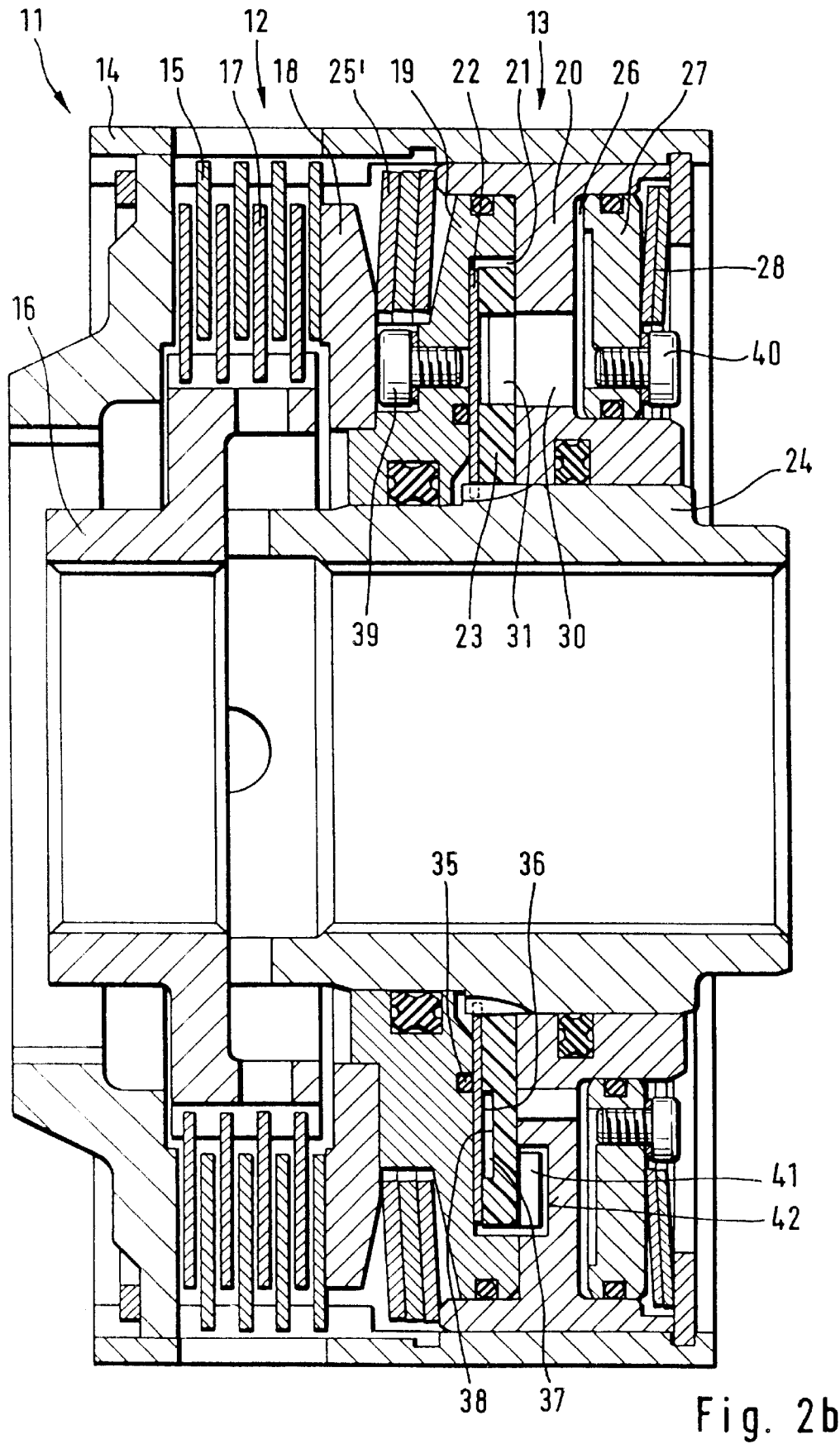

As the applications shown here are not based on relative linear movements, but on relative rotational movements, the groove 5 forming the shear gap is preferably formed as illustrated in FIG. 2a and 2b.

FIGS. 2a and 2b differ only in one detail and are described jointly below. A coupling assembly, generally shown at 11, comprises a controllable friction coupling, generally indicated at 12, in the form of a multi-plate coupling and a speed-sensing control assembly, generally indicated at 13. The friction coupling comprises a housing 14 non-rotatably holding outer plates 15. The assembly 11 further comprises a first hub 16 having inner plates 17 which are non-rotatably held. The friction coupling 12 is loadable by a pressure plate 18 regulated by the control assembly 13 arranged in the housing 14. The friction coupling 12 comprises an axially movable piston 19 and a rotational housing 20 which rotates together with the housing 14. Both form a pressure chamber 21 which contains a disc-shaped rotational member 22 and a disc-shaped control member 23. The rotational member 22 is rotationally fixed to a second hub 24 rotationally fixed to the first hub 16 and driven thereby. The first hub 16 may be integral with the second hub 24. The control member 23 rotates to a limited extent relative to the rotational housing 20 by a projecting rotational stop 41 which engages a delimited circumferential groove 42 in the rotational housing 20. An O-ring 35 inserted into the piston 19 serves as a spring to ensure close contact between the rotational member 22 and the control member 23.

When the rotational member 22 drives the hub 16 via teeth and changes its direction of rotation, the control member 23 is moved from one end position determined by the rotational stop 41 and the circumferential groove 42 to another end position determined by the rotational stop 41 and the circumferential groove 42. Further, the rotational housing 20 includes a reservoir 26 delimited by an axially movable annular piston 27. Disc springs 28 support the piston 27 on the housing 14. The reservoir 26 balances changes in volume in the pressure chamber 21. In the rotational housing 20, one identifiable axial connecting channel 30 in a circumferential position overlaps with a control aperture 31 in the control member 23. The control aperture 31 is positioned at one end of a shear channel 38. The shear channel 38 is formed by a circumferentially delimited shear groove 37 in the control member 23 and by the surface 36 of the rotational member 22. The parts rotating relative to one another are sealed relative to one another. The gap between the rotational member 22 and piston 19 radially outside the O-ring 35 is considered part of the pressure chamber 21. Two screws 39, 40 fill and ventilate the pressure chamber 21 and the reservoir 26. FIG. 2a shows disc springs 25 supported on the housing 14. The springs 25 act on the piston 19 and on the pressure chamber 21 as a counter force. FIG. 2b shows disc springs 25' supported on the housing 14. The springs 25' act on the pressure plate 18 and assist the pressure force generated in the pressure chamber 21.

FIGS. 3a and 3b show a rotational housing 20 and a control member 23. The shear groove 37 has apertures 31, 33 positioned at the ends of the groove 37. The control aperture 33 is located above a connecting channel 32 in the rotational housing 20. The control aperture 31 positioned at the other end overlaps with a radial connecting channel 43 in the rotational housing (not shown). Dashed lines indicate the position of a further through-aperture 30 in the rotational housing 20. The rotational stop 41 is located at the rear of the control member 23 and the circumferentially delimited groove 42, which limit the rotation of the control member 23 relative to the rotational housing 20.

Figure 4:
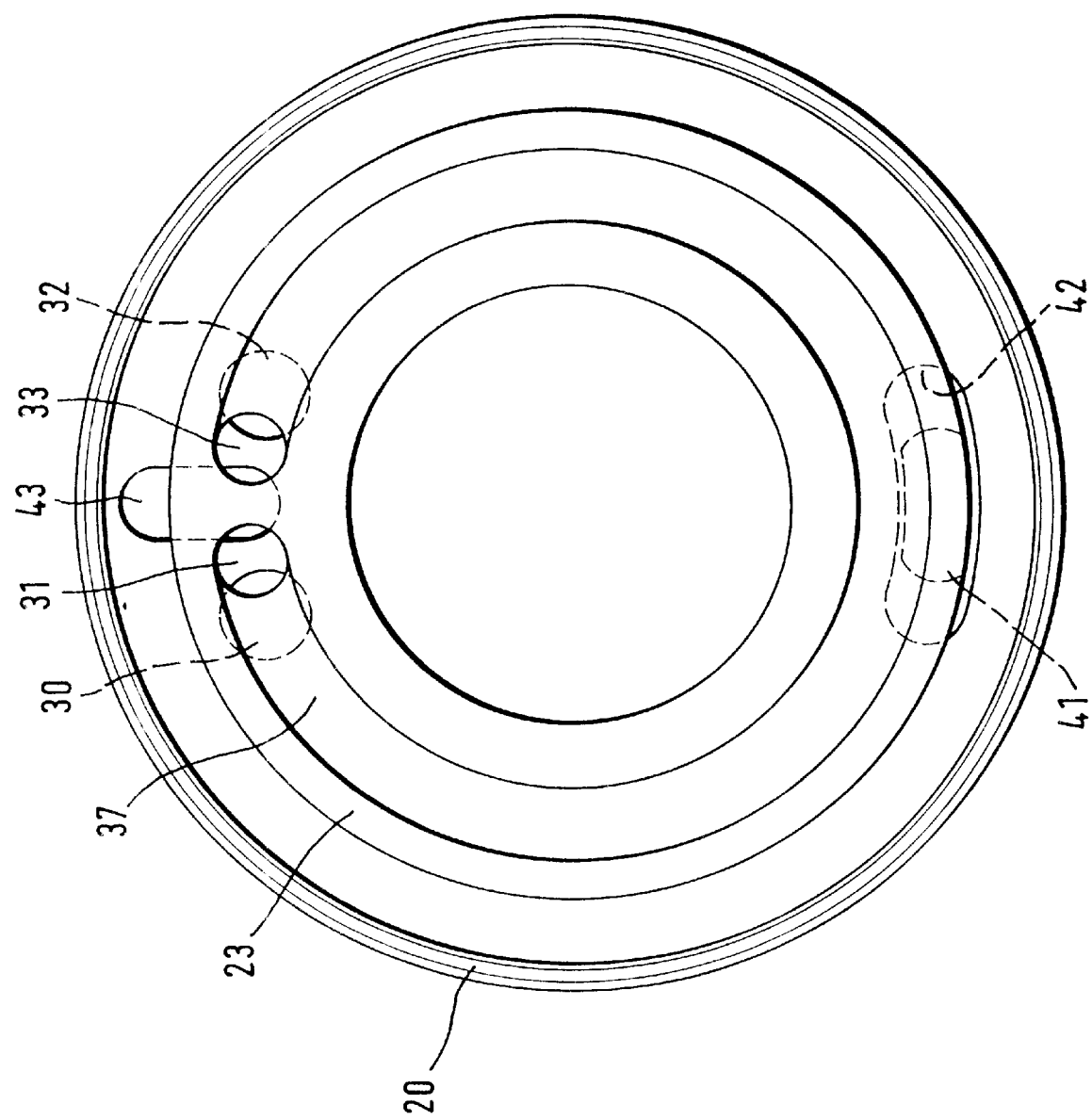
FIG. 4 is a view of the control member and the rotational member according to FIG. 3 in a second position.

FIG. 4 shows the rotational stop 41 is in the central position in the circumferential groove 42 between the two end positions. As a result pressure was previously built-up in the control aperture 31 at the one end of the shear groove 37, and the first control aperture 31 is still connected to the connecting channel 43 leading to the pressure chamber 21. The second control aperture 33 previously connected to the reservoir 26 by the connecting channel 32 has not lost its overlap with the connecting channel 32. The second control aperture 33 is also still connected to the connecting channel 32. It is possible to achieve a direct pressure relief from the connecting channel 43 and thus from the pressure chamber 21 to the connecting channel 33 and to the reservoir 26.

Figure 5C:
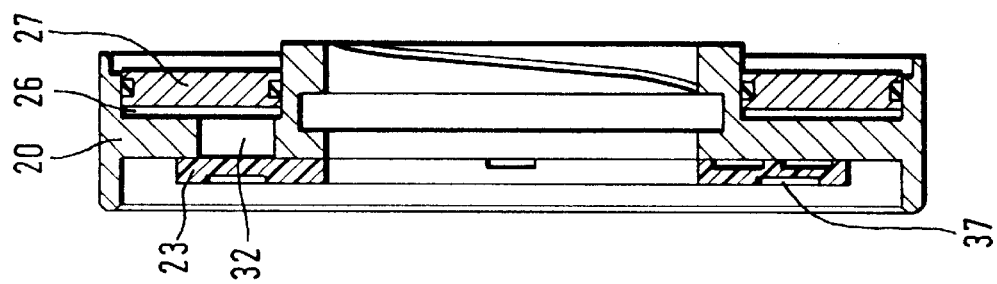
FIGS. 5a, 5b & 5c are a plain view of the control member and the rotational member according to FIGS. 3a and 3b in view (a) and in two longitudinal sections in views (b, c) in a third position.
Figure 5B:
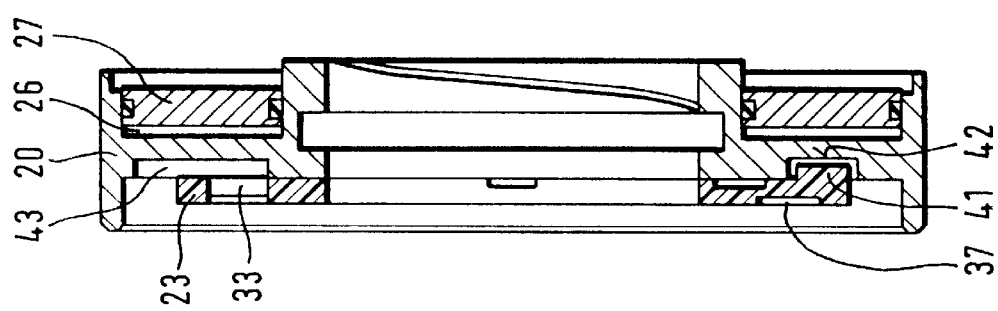
Figure 5A:
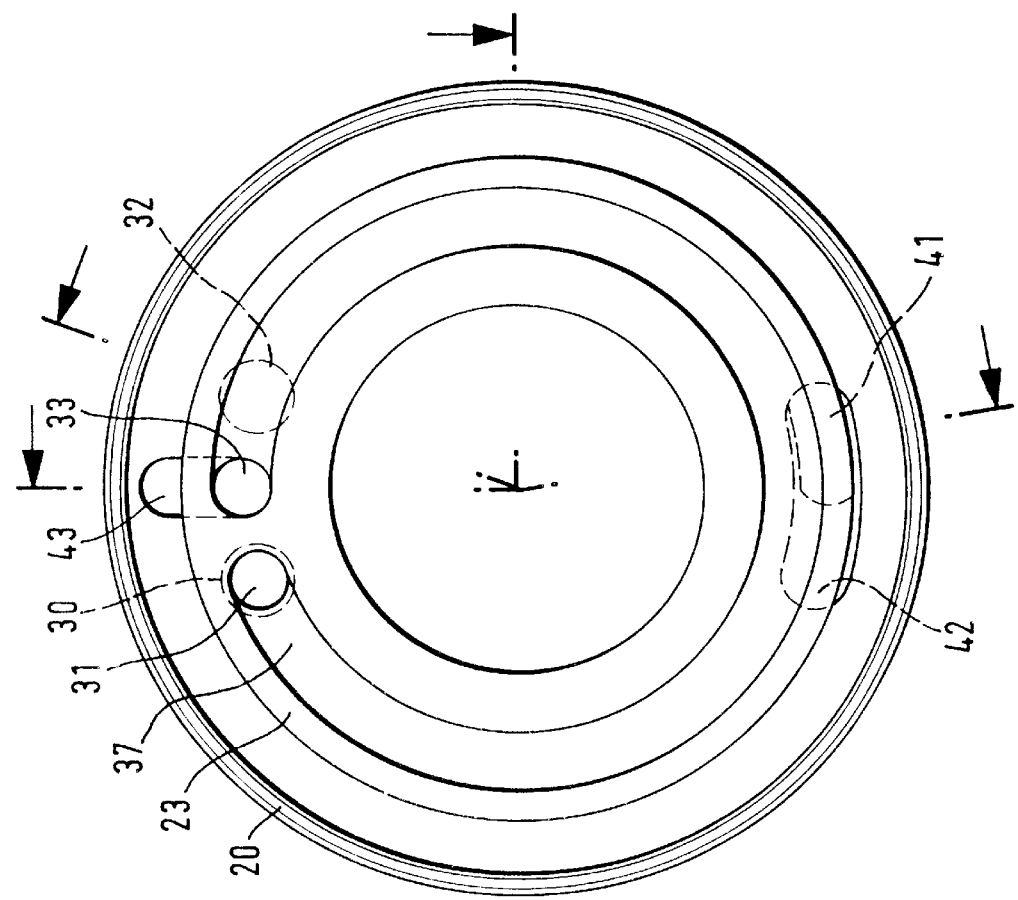

FIGS. 5a, b and c show the same details as FIGS. 3a, 3b and 4 except that the rotational stop 41 is in the opposite end position in the circumferential groove 42. The control aperture 31 overlaps with the second connecting aperture 30 into the reservoir 26. The second control aperture 33 is connected to the connecting channel 43 leading to the pressure chamber 21. The pressure build-up now takes place at the end of the shear groove 37 at the control aperture 33. The dashed lines indicate the position of the first connecting channel 32 leading to the reservoir 26 which now has no function.

Figure 6:
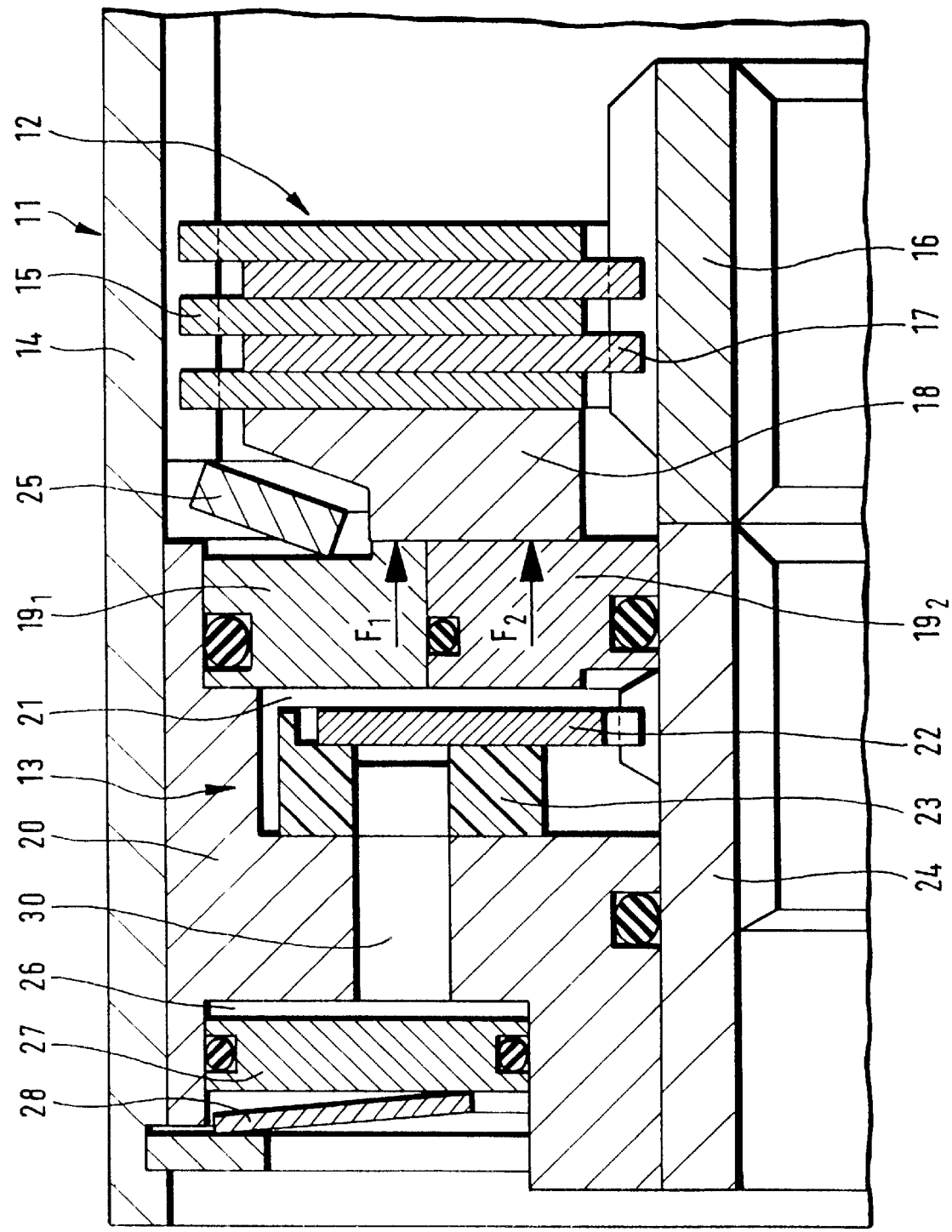
FIG. 6 is a coupling according to the subject invention in the form of a first embodiment in half of a longitudinal section.

FIG. 6 shows a coupling assembly, generally shown at 11, comprising a controllable friction coupling, generally indicated at 12, in the form of a multi-plate coupling and a speed sensing control assembly 13. The friction coupling 12 comprises a housing 14 non-rotatably holding outer plates 15. It further comprises a first hub 16 non-rotatably holding inner plates 17. The friction coupling 12 is loaded directly by a pressure plate 18 actuated by the control assembly, generally indicated at 13, arranged in the housing 14. The friction coupling 12 comprises a rotational housing 20 that rotates with the housing 14. The control assembly 13 comprises two pistons $19_1$, $19_2$ independently movable of one another and resting against the pressure plate 18. The rotational housing 20 and pistons $19_1$, $19_2$ form a pressure chamber 21 containing a disc-shaped rotational member 22 and a disc-shaped control member 23. The rotational member 22 is rotationally fixed to a second hub 24. The hub 24 is rotationally fixed to the first hub 16 and driven thereby. The first hub 16 may also be integral with the second hub 24. The control member 23 rotates to a limited extent relative to the rotational housing 20. O-rings inserted into the pistons $19_1$, $19_2$ seal the pistons relative to the rotational housing 20 and the hub 24 and relative to one another. The rotational housing 20 also contains a reservoir 26 delimited by an axially movable annular piston 27 sealed by O-rings relative to the rotational housing 20. The annular piston 27 is supported by disc springs 28 on the housing 14. The reservoir 26 balances any changes in volume in the pressure chamber 32. In the rotational housing 20 one axial connecting channel 30 is recognizable. A disc spring 25 is supported on the housing 14 and acts on the piston $19_1$ by a counter force acting against the force generated by the pressure in the pressure chamber 21. The piston forces generated by the pressure in the pressure chamber 21 acting on the pressure plate 18 are indicated by reference symbol $F_1$ for the outer annular piston $19_1$ and $F_2$ for the inner annular piston $19_2$.

Figure 7:
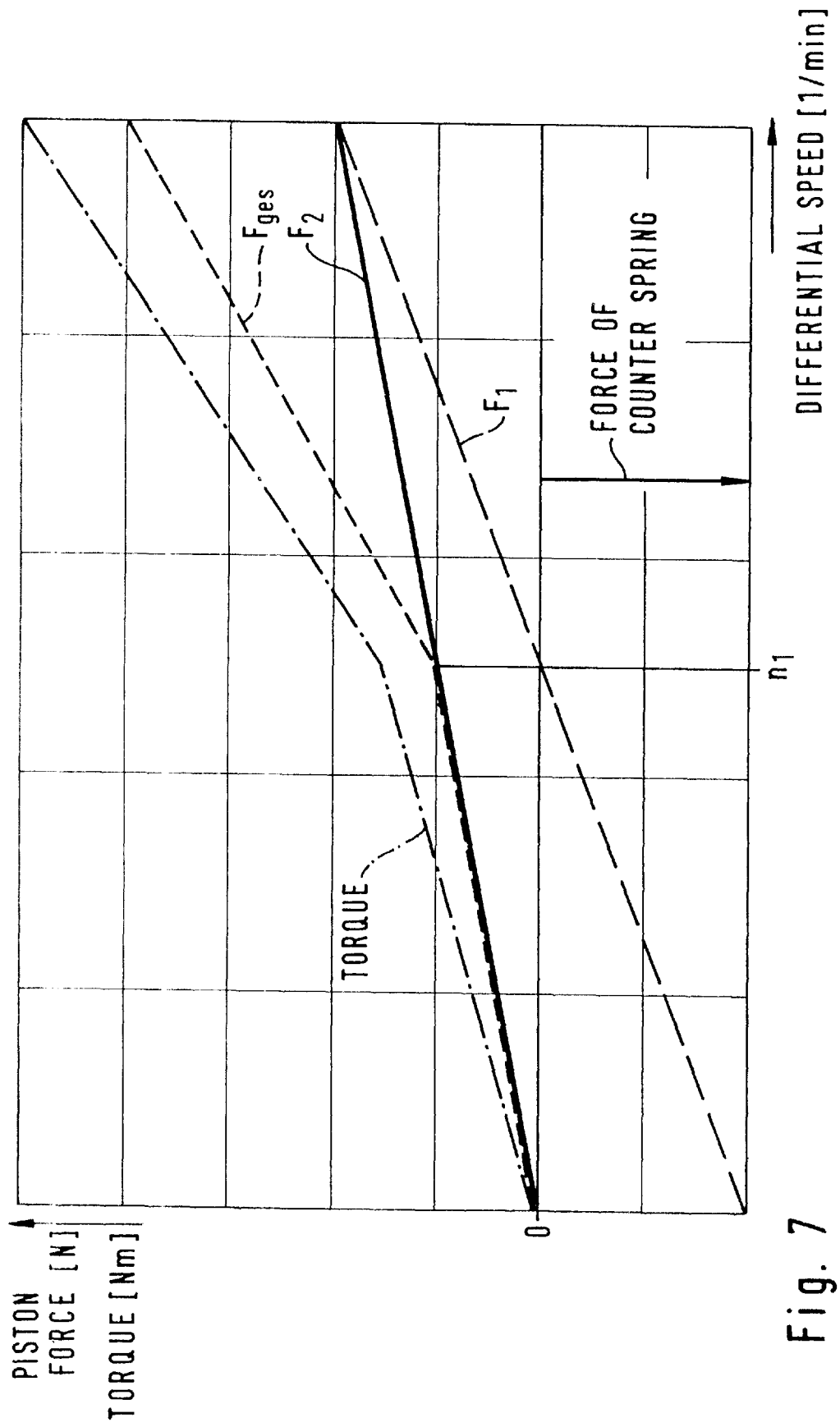
FIG. 7 is the characteristic curve of the coupling according to FIG. 6, referring to the piston force (N) and the locking torque (Nm) as a function of the differential speed (r.p.m.)

The diagram in FIG. 7 shows the curves of the piston force as a function of the differential speed. The force $F_1$ of the outer annular piston $19_1$ is neutralized by a counter force of the spring 25 up to a differential speed $n_1$ contributing to the total force of the pressure plate only above the speed $n_1$. The linearly increasing force $F_2$ of the freely movable piston $19_2$, contributes a positive value due to the prepressure generated by the spring 25 in the system at a differential speed of zero and greater.

The sum of the forces $F_1$ and $F_2$ is the total force $F_{ges}$ forming a bent characteristic curve. The torque curve extends in accordance with the characteristic curve and with the design and dimensions of the friction coupling.

Figure 8:
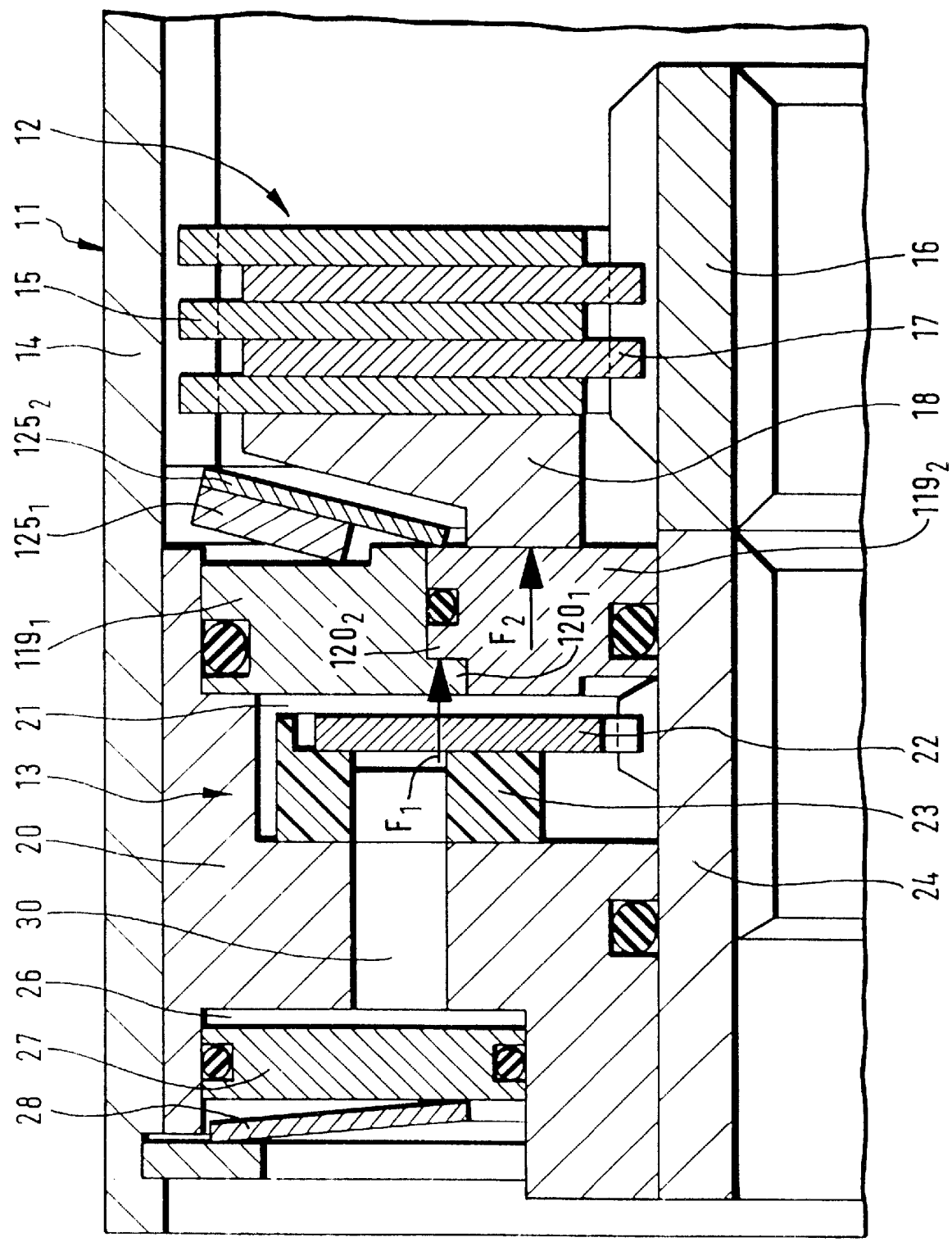
FIG. 8 is half of a longitudinal section through an inventive coupling in a second embodiment.

FIG. 8 shows a coupling assembly, generally shown at 11, comprising a controllable friction coupling, generally indicated at 12, in the form of a multi-plate coupling and a speed sensing control assembly, generally indicated at 13. The friction coupling 12 comprises a housing 14 nonrotatably holding outer plates 15. The coupling assembly 11 further comprises a hub 16 on which inner plates 17 are nonrotatably arranged. The friction coupling 12 is loaded by a pressure plate 18 actuated by the control assembly 13. The control assembly 13 is arranged in the housing 14 and comprises a rotational housing 20 which rotates with the housing 14. Further, an outer annular piston $119_1$ acts on an annular collar $120_2$ of the inner annular piston $119_2$ by means of an annular collar $120_1$ when there is an axial displacement towards the pressure plate 18. An inner annular piston $119_2$ is movable towards the pressure plate 18 independent of the outer annular piston $119_1$. Only the inner annular piston $119_2$ directly contacts the pressure plate 18. The rotational housing 20 and the pistons $119_1$, $119_2$ form a pressure chamber 21 containing a disc-shaped rotational member 22 and a disc-shaped control member 23. The rotational member 22 is rotationally fixed to a second hub 24 rotationally fixed to the first hub 16 and driven thereby. The first hub 16 may also be integral with the second hub 24. The control member 23 is rotatable relative to the rotational housing 20 to a limited extent. O-rings inserted into the pistons $119_1$, $119_2$ seal the pistons $119_1$, $119_2$ relative to the rotational housing 20 and the second hub 24 and relative to one another. The rotational housing 20 also contains a reservoir 26 delimited by an axially movable annular piston 27 sealed relative to the rotational housing 14 by O-rings. The annular piston 27 is supported on the housing 20 by a disc spring 28. The reservoir 26 balances any changes in volume in the pressure chamber 21. In the rotational housing 20 there is one identifiable axial connecting channel 30. Two disc springs $125_1$, $125_2$ are supported on the housing 14 and act on the pistons $119_1$, $119_2$ by means of a counter force acting against the force generated by the pressure in the pressure chamber.

Figure 9:
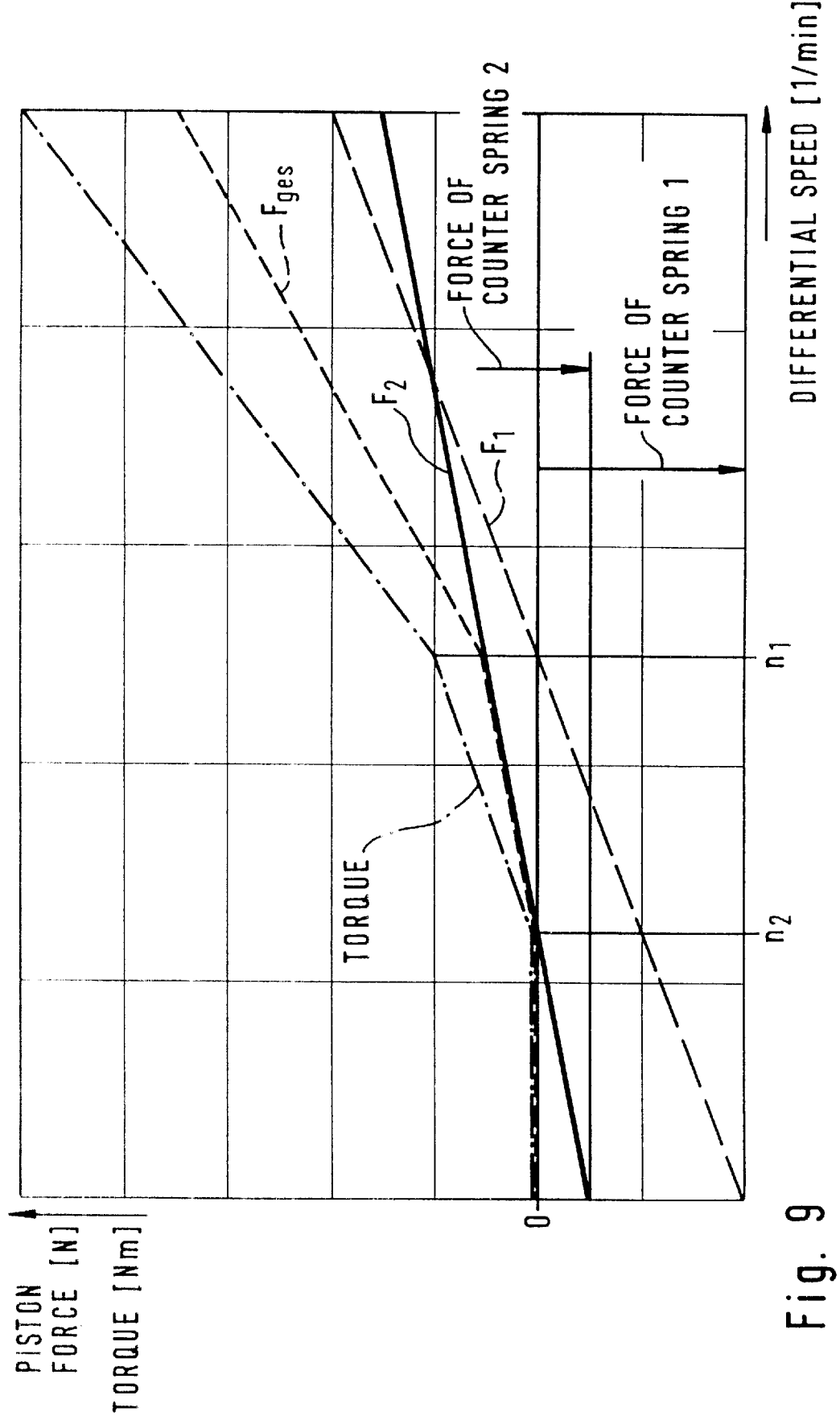
FIG. 9 shows the characteristic curve of the coupling according to FIG. 8, referring to the piston force (N) and the locking torque (Nm) as a function of the differential speed (r.p.m.).

The diagram in FIG. 9 shows the curves of the piston force as a function of the differential speed for the individual forces and the total force of the parts of the control assembly. $F_1$ is the effective force of the piston $119_1$. Up to a speed $n_1$, $F_1$ is suppressed by the strong counter force of the spring $125_1$. $F_2$ is the force of the inner annular piston $119_2$. Up to a differential speed $n_2$, $F_2$ is suppressed by the weaker counter force of the disc spring $125_2$. $F_{ges}$ refers to the total force acting on the pressure plate 18. Up to the differential speed $n_2$, $F_{ges}$ is approximately zero. Initially $F_{ges}$ is flat and rises more steeply from a differential speed $n_1$ and greater. The curve of the torque behaves analogously to the total force, and to the design and dimensions of the friction coupling.

I claim:

1. A device for transmitting torque between two parts rotatably mounted relative to one another comprising:

a friction coupling having friction elements rotationally fixed to each of two rotatable parts, said friction coupling being loadable by at least one movable piston which, on one side, delimits a pressure chamber filled with a viscous fluid, said pressure chamber being connected to a reservoir, wherein said pressure chamber being formed by a rotational housing and said piston, and the rotational housing is connected to one of said rotational parts, a rotational member rotates in said pressure chamber and is connected to said other rotatable part, with rotational faces of said rotational member, and counter faces of a control member which are positioned in said pressure chamber, constituting at least one shear channel formed by a shear groove laterally delimited by walls and extending between two ends in the circumferential direction and by a surface covering said shear groove and being rotatable relative thereto, said control member being rotatable to a limited extent between two end positions relative to said rotational housing and said shear groove being connected to said reservoir and to said pressure chamber by control apertures in said control member at said end of said shear groove, said connection being effected, in said two end positions of the control member, by a control aperture being arranged at a front end of said shear groove 20 seen in the direction of relative rotation—communicating with said reservoir, and a control aperture arranged at a rear end of said shear groove—seen in the direction of relative rotation—communicating with said pressure chamber, characterized in that at least two separate, axially movable annular pistons delimit said pressure chamber, and on the basis of different characteristic functions, said pistons convert pressure in said pressure chamber to an axial force acting on said friction coupling.

2. A device according to claim 1, characterized in that two annular pistons are movable mechanically independently of one another and act on a pressure plate which loads said friction coupling, and only one of said annular pistons is pretensioned with a counter force acting against the force applied by the pressure in said pressure chamber.

3. A device according to claim 2, characterized in that the other of said annular pistons is axially movable in a pretension-free way.

4. A device according to claim 1, characterized in that one of two annular pistons, is axially movable by the pressure in said pressure chamber, mechanically independent of a second of said annular pistons, said second annular piston is axially supported on said first annular piston when pressure in said pressure chamber generates a force which axially moves the second annular piston.

5. A device according to claim 4, characterized in that said first annular piston which is movably independent of said second piston, is pretensioned with a weak counter-force acting against the force applied by the pressure in said pressure chamber and said second annular piston supported on said first annular piston is pretensioned with a strong counter-force acting against the force applied by the pressure in said pressure chamber.

6. A device according to claim 1, characterized in that disc springs supported on said rotational housing generate pretensioning forces for said annular pistons.

* * * * *